US012438957B1

(12) United States Patent
Ranns et al.

(10) Patent No.: US 12,438,957 B1
(45) Date of Patent: Oct. 7, 2025

(54) METHOD AND SYSTEM FOR IP HEADER COMPRESSION

(71) Applicant: GRAPHIANT, INC., Fremont, CA (US)

(72) Inventors: Neale Ranns, Hure (FR); IJsbrand Wijnands, Leuven (BE)

(73) Assignee: GRAPHIANT, INC., Fremont, CA (US)

(*) Notice: Subject to any disclaimer, the term of this patent is extended or adjusted under 35 U.S.C. 154(b) by 0 days.

(21) Appl. No.: 17/521,681

(22) Filed: Nov. 8, 2021

Related U.S. Application Data

(63) Continuation of application No. 17/481,036, filed on Sep. 21, 2021, now abandoned.

(51) Int. Cl.
  *H04L 69/04* (2022.01)
  *H04L 61/251* (2022.01)
  *H04L 69/22* (2022.01)

(52) U.S. Cl.
  CPC ............ *H04L 69/04* (2013.01); *H04L 61/251* (2013.01); *H04L 69/22* (2013.01)

(58) Field of Classification Search
  CPC ........ H04L 69/04; H04L 61/251; H04L 69/22
  See application file for complete search history.

(56) References Cited

U.S. PATENT DOCUMENTS

| | | | | |
|---|---|---|---|---|
| 7,215,667 | B1* | 5/2007 | Davis | H04L 63/061 370/464 |
| 8,769,057 | B1* | 7/2014 | Breau | H04L 61/103 709/222 |
| 2004/0001508 | A1* | 1/2004 | Zheng | H04L 12/4633 370/466 |
| 2004/0103277 | A1* | 5/2004 | Seada | H04L 63/029 713/160 |
| 2006/0088051 | A1* | 4/2006 | Mulligan | H04L 69/04 370/477 |
| 2010/0189103 | A1* | 7/2010 | Bachmann | H04L 69/04 370/465 |
| 2012/0239997 | A1* | 9/2012 | Otsuki | H04L 1/0076 714/746 |
| 2013/0332767 | A1* | 12/2013 | Fox | H04L 67/025 714/4.3 |
| 2015/0350069 | A1* | 12/2015 | Padgett | H04L 45/72 370/236 |
| 2017/0220256 | A1* | 8/2017 | Balasubramonian | G06F 11/1048 |
| 2020/0137628 | A1* | 4/2020 | Kandasamy | H04L 69/166 |

* cited by examiner

*Primary Examiner* — Bryan Y Lee
(74) *Attorney, Agent, or Firm* — Maschoff Brennan

(57) ABSTRACT

Embodiments for header compression, are disclosed, herein. For header compression, an ingress CPE is disclosed herein. The ingress CPE may include a processor and a memory storing computer-executable instructions that when executed, cause the processor to receive a data packet, which includes an inner header, a payload portion, and an outer header. The inner header comprises a utilized portion and the unutilized portion. The computer-executable instructions further cause the processor to compress the inner header by discarding at least the unutilized portion in the inner header to obtain a compressed inner header.

20 Claims, 5 Drawing Sheets

METHOD AND SYSTEM FOR IP HEADER COMPRESSION

CROSS REFERENCE TO RELATED APPLICATIONS

This application is a continuation of U.S. Non-Provisional patent application Ser. No. 17/481,036, titled "METHOD AND SYSTEM FOR IP HEADER COMPRESSION", filed on Sep. 21, 2021, which is assigned to the assignee hereof and hereby, expressly incorporated by reference herein.

FIELD OF THE INVENTION

Embodiments discussed in the present disclosure are generally related to Internet Protocol (IP) header compression in communication networks. In particular, the embodiments discussed are related to compression of Internet Protocol version 6 (IPv6) header of a data packet.

BACKGROUND OF THE INVENTION

IP Header compression techniques are employed to reduce the size of a header in a data packet that traverses a communication network. This reduction in size enables an efficient usage of available bandwidth in the communication network amongst other things. However, in the existing IP header compression techniques, each node, along the routing path of the data packet, is required to store a context information associated with the compressed IP header in order to decompress it later. It may be desirable to optimize the computational resources (e.g. storage and processing) consumed in handling such context information at each node along the routing path.

In addition, the first data packet in each packet stream includes a full IP header to establish the context information at each node along the routing path, to enable IP header compression for subsequent data packets in the packet stream. Since the full header of the first data packet has a considerably higher size compared to its compressed version, it may result in a higher bandwidth cost. Consequently, the size of the first data packet may be higher than the maximum transmission unit (MTU) size allowed by the network, which may result in undesirable fragmentation of the data packet. Such fragmentation may result in out-of-order delivery or loss of the fragmented data packets.

Therefore, there is a need for providing a more resource efficient and reliable mechanism for communication of data packets.

SUMMARY OF THE INVENTION

Embodiments of an ingress CPE and a corresponding method for header compression, are disclosed that address at least some of the above challenges and issues.

In accordance with the embodiments of this disclosure, an ingress CPE is described. The ingress CPE includes a processor and a memory storing computer-executable instructions that when executed, cause the processor to receive a data packet. The data packet includes an inner header, a payload portion, and an outer header. The inner header includes a utilized portion and an unutilized portion. The computer-executable instructions further cause the processor to compress the inner header by discarding at least the unutilized portion in the inner header to obtain a compressed inner header.

BRIEF DESCRIPTION OF THE DRAWINGS

Further advantages of the invention will become apparent by reference to the detailed description of preferred embodiments when considered in conjunction with the drawings.

DETAILED DESCRIPTION

Figure 1:
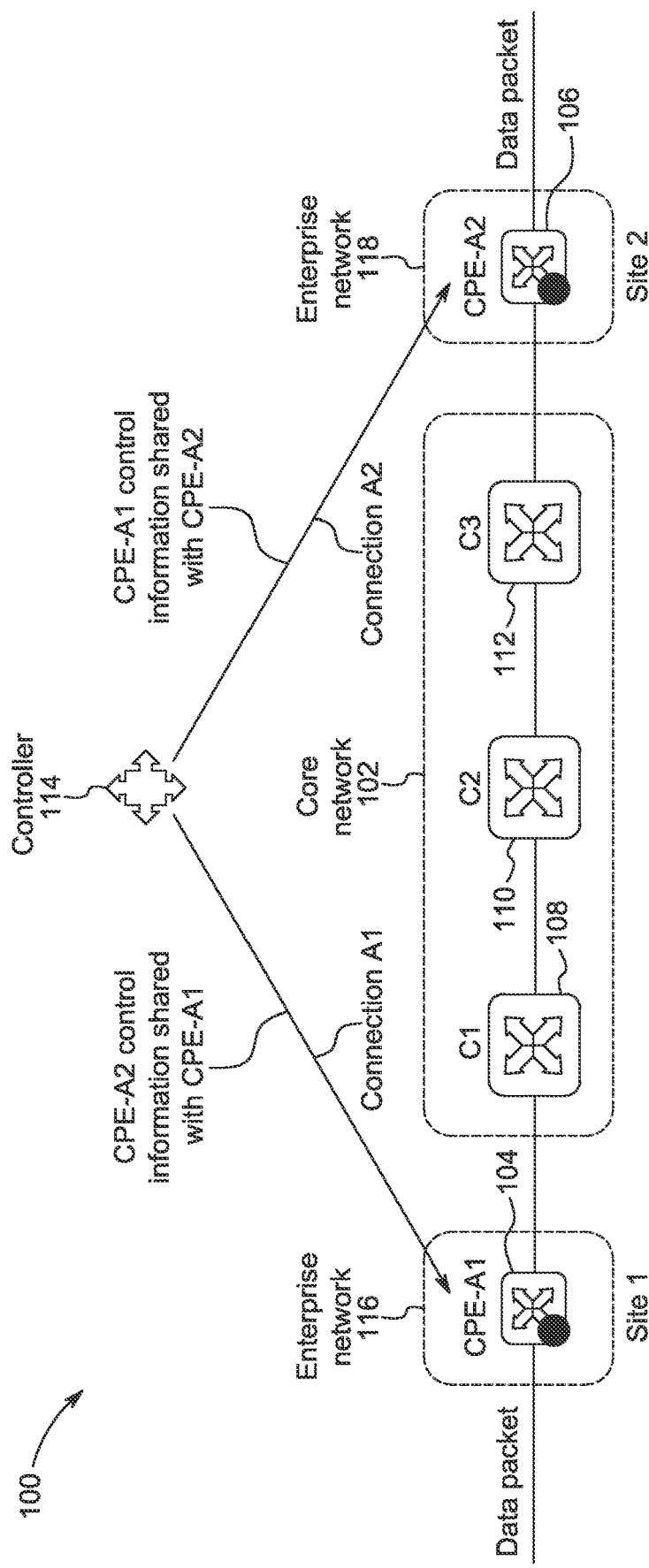
FIG. 1 illustrates a network architecture for implementing disclosed embodiments of a secure communication network, according to an embodiment.

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown but is to be accorded the widest possible scope consistent with the principles and features disclosed herein.

Certain terms and phrases have been used throughout the disclosure and will have the following meanings in the context of the ongoing disclosure.

A "network" may refer to a series of nodes or network elements that are interconnected via communication paths. The network may include any number of software and/or hardware elements coupled to each other to establish the communication paths and route data via the established communication paths.

An "enterprise network" may refer to a network owned, leased, and/or managed by customers, which may include one or more business entities. By way of an example, the enterprise network may refer to internal network infrastructure employed by an enterprise or organization to provide connectivity among users, devices, and applications that are local to the enterprise. Various such enterprise networks located at different sites may need to be connected to each other via a core network for external communication. Therefore, an enterprise network may include one or more internal networks that are located at geographically separate sites.

The "core network" may refer to a network infrastructure that may provide services to connect one or more enterprise networks with each other. The core network represents a central or core element that provides one or more routing paths for exchange of information between different enterprise networks. The core network may facilitate high-capacity communication between different enterprise networks located at different geographical locations.

A "core node" may refer to any node within the core network, which is capable of routing data packets to another core node within the core network. The core node may include, but not limited to an access point, a router, a bridge, a server, a gateway, a switch, a modem, a relay, or a hub.

In the core network, an "ingress core node" handles incoming data from another network such as an enterprise network. In the core network, an "egress core node" handles outgoing data to another network. An "intermediate core node" refers to a node between the ingress core node and the egress core node in the core network. In the examples provided in this disclosure, "Cx" generally refers to core nodes (e.g., C1, C2, C3 and so on), "C1" refers to the ingress core node, C2 refers to the intermediate core node, and C3 refers to the egress core node.

A "routing path" may refer to a traversal path for a given data packet in the core network. The routing path may include a number of hops from one core node to another core node, within the core network. Herein, each core node may be connected to another core node within the core network, via a "hop". Similarly, a core node may be connected to subsequent node in an enterprise network (such as a CPE) via another hop.

A "service provider" (SP) may refer to an entity providing, managing, and/or operating a core network, over which data is routed to and/or from one or more enterprise customers. The disclosed architecture provides a method for the SPs to provide connectivity services to the one or more enterprise customers over the core network, which is a shared core infrastructure. Non-limiting examples of SPs may include Secure Access Service Edge (SASE) providers, Network as a Service (NaaS) providers, Multiprotocol Label Switching (MPLS) Virtual Private Network (VPN) providers, and Software Defined Wide Area Network (SD-WAN) providers.

In general, the core networks and enterprise networks may include any known network infrastructure in the context of telecommunication networks. In the spirit of the ongoing disclosure, such network infrastructure may at least include one or more nodes such as, but not limited to, access points, routers, bridges, servers, gateways, switches, modems, relays, and hubs. The enterprise networks may include one or more of the above-mentioned nodes in addition to one or more customer premises equipment(s) (CPEs), which are located within the premises of the enterprise networks. The CPEs may include, but not limited to, gateways, switches, routers, network adapters, set top boxes, and so on.

An "endpoint device" may be any device associated with customers, individuals, or end users. The endpoint device may be a source node and/or a destination node to transmit and/or receive data packets from customer premises equipments (CPEs) via the core network. In an embodiment, the source node may create and transmit the data packets to the destination node, via the ingress CPE, core network, and the egress CPE. The endpoint device may include, but is not limited to, a computer, a personal digital assistant (PDA), a laptop, a cellular telephone, a tablet, or any other device or network element capable of initiating or exchanging data within one or more communication networks An "ingress CPE" may receive data packet(s) originated from an endpoint device and perform encryption and/or encapsulation on the received data packets to create encrypted and/or encapsulated data packet(s). The ingress CPE may transmit the encrypted and/or encapsulated data packet(s) towards an "egress CPE" via the core network. The egress CPE may receive the encrypted and/or encapsulated data packet(s) from the core network and transmit these data packet(s) to an intended destination node. In this disclosure, "CPE-Ax" refers to CPEs of a customer enterprise A. For example, CPE-A1, CPE-A2, and CPE-A3 refer to CPEs for a customer enterprise A. Similarly, for a different customer B, the CPEs may be denoted by "CPE-Bx" and so on.

Furthermore, a "data packet" refers to data or information that is packaged for transmission over a network. The data packet created by the source node or ingress CPE may include a payload portion, a metadata portion, and one or more headers. In an embodiment, the metadata may include the one or more headers while in another alternate embodiment, the one or more headers in the data packet may be partially or completely excluded from the metadata portion. The headers may include one or more of, but not limited to, an inner internet protocol (IP) header and an outer IP header. The payload portion may include data (e.g., customer related data) that the source node of an enterprise network may intend to transmit to the destination node of the enterprise network. Such data included in the payload portion may be sensitive and/or confidential and may need to be protected from any attack or impersonation by external or suspicious parties. Further, the term "data" refers to any type of information, such as but not limited to messages, voice, video, media, or any other information in any appropriate format that may be communicated from one point to another.

The "compression" of a header may include reducing the size of the inner header by discarding at least an unutilized portion or bits in the inner header to obtain a compressed inner header.

The "decompression" of a header may imply reconstructing the full inner header from the compressed inner header.

Further, the compressed inner header may include a "version field," which may specify a version number that indicates internet protocol (IP) format of the data packet. For instance, a format of an IP version 4 (IPv4) header is different from an IP Version 6 (IPv6) header in terms of the header fields, their respective sizes, and size of the overall header. In the disclosed embodiments, the proposed compression of IPv6 header results in a new version of the header, i.e., IP version 7 (IPv7), which is described in more detail later in this disclosure. The compressed inner header may additionally include one or more fields such as, but not limited to, traffic class, flow label, payload length, next header, and hop limit. The function and description of these fields are known in the art and are not described here for brevity.

In accordance with an embodiment, the term "slice" may refer to a group of nodes in the enterprise networks that may access a common service. Each node (e.g. source node) may communicate with other nodes (e.g. destination node) within the slice(s), in accordance with an embodiment. In one example, the source node and the destination node in an enterprise network may be part of a slice which may access communication services provided by the core network. According to the embodiments presented herein, each slice may be associated with a slice identifier (ID) and each node in the enterprise networks and the core networks may be associated with a device ID. In an embodiment, multiple nodes belonging to a slice may be associated with a corresponding (common) slice ID. Therefore, such an addressing scheme enables unique addressing of each node by a combination of device ID and slice ID for communication between the nodes in that slice.

During a set-up phase, each node is configured to implement a unique "addressing scheme", thereafter, as described later in this disclosure. Accordingly, the source node may be identified by the unique combination of the device ID and slice ID associated with the source node. Similarly, the destination node may be identified by the unique combination of the device ID and slice ID associated with the destination node. Further, if source and destination nodes belong to the same slice, then the corresponding slice ID will be commonly associated with both the source and destination nodes.

In an embodiment, the disclosed approach enables creation of new slices and corresponding slice IDs that can be associated with the participating nodes. For instance, if a node in one slice intends to communicate with another node in another slice, both these nodes may be configured to become part of a new slice with a new and different slice ID. The new slice ID is shared by the two nodes and is different from the slice IDs corresponding to other slices.

Embodiments of this disclosure present the unique address scheme for communication between nodes within a slice. In this address scheme, the inner header of the data packet received by the ingress CPE, may include a source address field and a destination address field. In one example, the inner header may be an IPv6 header. The source address field may include a device ID associated with the source node and a slice ID of the slice associated with the source node (and destination nodes). The source address corresponding to the source node may be determined based on the device ID of the source node (source device ID) and the slice ID. Further, the destination address field may include a device ID of the destination node (destination device ID) and the slice ID. The destination address corresponding to the destination node may be determined based on the destination device ID and the slice ID. Here, the slice ID included in the source address field may be re-used to be combined with the device ID of the destination node to determine the destination address. The re-use of the slice ID for determining the destination address provides an opportunity to discard the repetitive bits in the IP header.

A portion of the source address field that includes the source device ID and the slice ID along with a portion in the destination address field that includes destination device ID and the re-used slice ID, may be collectively referred to as a "utilized portion" in the inner header. A remaining portion in each of the source address field and the destination address field may remain unused in the address scheme, as described later in this disclosure. This portion may collectively be referred to as an "unutilized portion." In an embodiment, the unutilized portion may include zero-bit values, as padding.

For secure communication of data packets through a network, various "encapsulation" techniques defined by the IPsec standard, may be implemented to encapsulate the data packets. For instance, the deployed encapsulation techniques may include, but not limited to, an ESP encapsulation as defined by the IPsec standard, a customized ESP encapsulation, and a generic routing encapsulation (GRE). One or more of these techniques may be implemented, either individually or in combination with each other, without departing from the scope of the ongoing description.

In order to further enhance the security of the data packet, one or more "encryption" techniques may also be implemented. For instance, encryption techniques such as, but not limited to, ESP-based encryption, Advanced Encryption Standard (AES)-based encryption, Data Encryption Standard (DES)-based encryption, and Triple-DES based encryption may be implemented to encrypt the data packet Embodiments of this disclosure present a method implemented in an ingress CPE for compressing an inner header of a data packet by discarding at least the unutilized portion in the inner header. The method may include receiving the data packet from a source node. Here, the received data packet may include the inner header, the payload portion, and the outer header. Further, the inner header includes the utilized portion and the unutilized portion.

The inner header may include a source address field and a destination address field. In an embodiment, the source address field corresponds to the source node and the destination address field corresponds to the destination node. The method further includes transmitting the data packet to the ingress core node of the core network. The ingress core node is configured to transmit the data packet to an egress core node via one or more intermediate core nodes of the core network. In another alternate embodiment, the ingress core node is configured to decompress the compressed inner header to access a destination address and re-compress the inner header. The ingress core node is further configured to transmit the data packet including the re-compressed inner header based on the destination address, to an egress core node via one or more intermediate core nodes of the core network.

In an embodiment, the destination address field includes a device identifier that identifies the destination node and a slice identifier associated with a group of devices associated with the destination node. Further, the source address field includes a device identifier that identifies the source node, and the slice identifier. In an embodiment, each of the device identifiers includes 32 bits and the slice identifier includes 32 bits. Further, the unutilized portion includes 128 bits in accordance with an embodiment. In an embodiment, the compressed inner header includes a version field that indicates a version number associated with the compressed inner header. In an embodiment, the version number of the compressed inner header is IPv7.

In an embodiment, the method further includes compressing the inner header by additionally discarding the slice identifier from one of the source address field and the destination address field. The compressed inner header includes each of the device identifiers and the slice identifier. In embodiment, each of the device identifiers and the slice identifier are usable to compute a source address associated with the source node and a destination address associated with the destination node.

These and other embodiments of the methods and systems are described in more detail with reference to FIGS. 1, 2, 3, 4*a*, and 4*b*.

FIG. 1 illustrates a network architecture 100, in accordance an embodiment. In this embodiment, the network architecture 100 may include a core network 102 operated by a service provider and an enterprise network 116 operated by customer A and located at site 1. The network architecture 100 may also include an enterprise network 118 operated by the customer A and located at site 2 that may be geographically separated from site 1. Further, the core network 102 may represent a network owned and/or operated by the service provider to provide connectivity services to one or more customers, such as customer A depicted in FIG. 1. Further, the enterprise network 116 may communicate with the enterprise network 118 via the core network 102.

A person skilled in the art would understand that it is not necessary that the enterprise network 116 and enterprise network 118 are operated by the same customer and they may be owned by different customers as well. For example, both these enterprise networks may either be different internal networks (e.g. intranets) of the same organization, at different geographical locations or they may be networks owned and operated by separate organizations, at different locations. Additionally, there can be any number of enterprise networks in the network architecture 100 and one or more of these enterprise networks may be operated by one customer while the remaining may be owned by other customers. Further, such enterprise networks may be located geographically in different locations, which may either be in proximity to each other or remotely located with respect to each other. It would be apparent to a person skilled in the art that an enterprise may include more than one enterprise networks at multiple locations. FIG. 1 merely exhibits a non-limiting example of enterprise networks 116 and 118 that are located at different geographical locations. However, any number of enterprise networks without geographical limitations, may be included herein to implement the embodiments presented herein. Other configurations and scenarios are also possible where information can be exchanged between sites of one enterprise and/or between sites of another enterprise irrespective of whether all such sites are remotely located or not with respect to each other.

Referring to FIG. 1, the core network 102 may represent backend infrastructure that may provide routing paths for exchange of information between different enterprise networks such as enterprise networks 116 and 118. In one example, the core network 102 may include one or more core nodes C1 to Cn (e.g. C1 108, C2 110, and C3 112), as described earlier in this disclosure. In one example, the ingress CPE (e.g., CPE-A1 104) and the egress CPE (e.g., CPE-A2 106) may be a part of the enterprise network 116 and the enterprise network 118, respectively. Further, the core network 102 may communicate with the enterprise networks (e.g., 116, 118) through at least one enterprise node (e.g., CPE-A1 104 and CPE-A2 106). Thus, the core network 102 may facilitate exchange of information between enterprise networks 116 and 118.

The network architecture 100 may also include a controller 114, which may be a dedicated controller for a customer (e.g. customer A), to facilitate communication between the enterprise nodes of enterprise networks 116 and 118 via the core network 102. In an embodiment, the controller 114 may be a multi-tenant controller configured for multiple tenants such as enterprise A, enterprise B, enterprise C and so on. A multi-tenant controller may include logical segmentation for different customers and thus, segmentation may be maintained across different customers.

Additionally, the controller 114 may correspond to a server computing device associated with the customer A. The controller 114 may, for instance, be a centralized managing node that may be owned, leased, and/or operated by the customer A to manage communication between the enterprise nodes owned and operated by the customer A. The controller 114 may, for instance, facilitate control plane functions associated with the enterprise networks A1 and A2, as described later in this disclosure. Based on the control plane functions, the controller 114 may also facilitate establishment of a data plane that connects the enterprise networks A1 and A2 for communication of data packets between these enterprise networks. Additionally, the controller 114 may also facilitate configuration of the respective CPEs (ingress CPE and egress CPE) of these enterprise networks, for communication over the data plane, as described later in this disclosure. In an embodiment, the controller 114 may be an "off path" controller, which is a dedicated controller specifically configured to perform the above-described functions. In an alternate embodiment, the controller 114 may be an "in-band" controller. An in-band controller may be implemented in one or more core nodes, configured to perform the above-described control plane functions in addition to being configured to perform the data plane functions of the core node, as described later in this disclosure.

In an embodiment, the controller 114 may facilitate exchange of control information over a control plane between CPE-A1 204 and CPE-A2 206. The control information may include, but not limited to, routing information (e.g., MPLS labels), encryption keys/security association information, and core network association information. The controller 114 may then facilitate setting up secure communication channels between various enterprise nodes such as CPE-A1 204 and CPE-A2 206 in the form of end-to-end IPsec tunnels. These tunnels may be set up to enable direct and secure communication between the enterprise nodes over the data plane.

In one example, the controller 114 may facilitate direct communication between the CPEs by performing any of the known authentication, authorization, and accounting (AAA) procedures. Additionally, in accordance with the embodiments of this disclosure, the controller 114 may, on successfully authenticating the CPEs, establish a connection to each CPE (e.g., CPE-A1 104 and CPE-A2 106). The controller 114 may then, receive encryption keys from CPE-A1 104, and transmit them to CPE-A2 106, in accordance with an embodiment. In an embodiment, the above (control plane) procedures may be performed before CPE-A1 104 transmits a data packet to CPE-A2 106, via the data plane. The key sharing by the controller 114 may enable CPE-A2 106 to subsequently decrypt (and decapsulate) the data packet transmitted by CPE-A1 104, via the core network 214.

In one example, the controller 114 may implement a Controller-based Internet Key exchange (IKE) mechanism to exchange encryption keys between CPE-A1 104 and CPE-A2 106. Here, CPE-A1 104 may create a Diffie-Hellman public key/value for end-to-end encryption. CPE-A1 104 may then, share the Diffie-Hellman public key with the controller 114, which may further share this public key/value with CPE-A2 106 (and vice versa for CPE-A2 106). CPE-A1 204 and CPE-A2 106 may then, compute the end-to-end encryption key based on the received Diffie-Hellman public key/value, as known in the Internet Engineering Task Force (IETF) standard.

In an embodiment, the enterprise networks 116 and 118, and the core network 102 may implement MPLS-based routing of data packets. Here, the controller 114 may communicate (to CPE-A1 104) a label (e.g., an MPLS global label) associated with the egress core node that may be connected to CPE-A2 106. Additionally, the controller 114 may communicate another label (e.g., an MPLS link label) associated with a link (or hop) between the egress core node and CPE-A2 106. CPE-A1 104 may include these MPLS labels in the data packet transmitted to the ingress core node of the core network 114 during data plane communication. In one example, these labels may be included in the outer header of the data packet. The label associated with the egress core node facilitates determination of a routing path of the data packet in the core network 114, as will be described in more detail with reference to FIG. 2.

In another embodiment where MPLS-based routing is not implemented, the controller 114 may not include labels in the data packet. In one example, Segment Routing over IPv6 data plane (SRv6) routing may be implemented instead of the MPLS-based routing to route the data packet based on the destination address. In this embodiment, the routing of the data packet within the core network 114 may be performed based on the destination address associated in the data packet, as will be described later in the context of FIG. 2.

In an embodiment, the controller 114 may at least include a processor, a memory storage and one or more hardware and/or software modules, as may be required for implementing the above-described functions of the controller 114. In one example, the controller 114 may be a software-defined wide area networks (SDWAN) controller, which may include but not limited, an Application Policy Infrastructure Controller (APIC), a vManage Controller, a vSmart controller, and so on.

Figure 2:
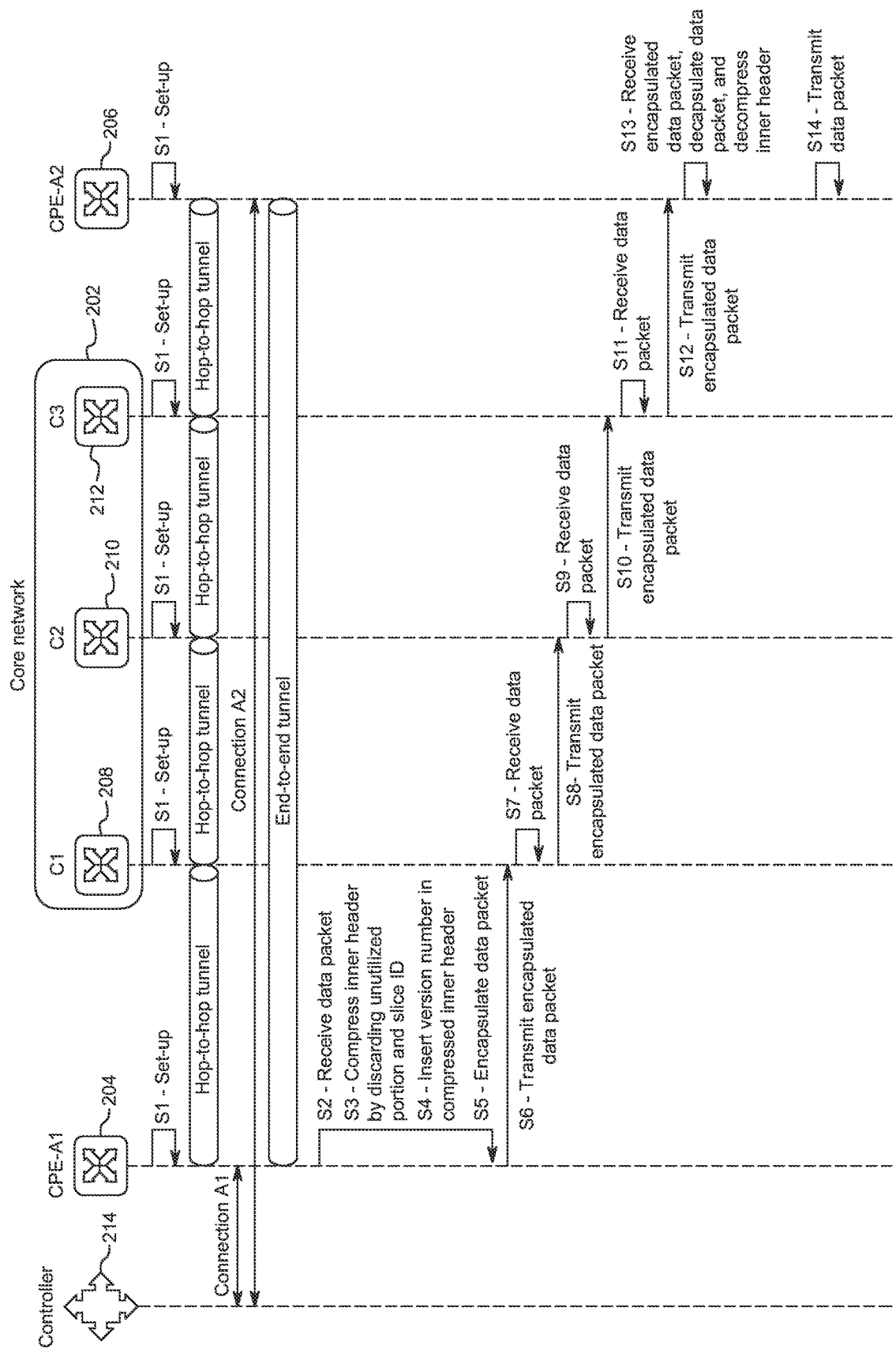
FIG. 2 is a signal flow diagram to illustrate flow of a data packet between enterprise nodes of enterprise networks, according to an embodiment.

FIG. 2 is a signal flow diagram to illustrate the flow of a data packet between enterprise nodes of the enterprise networks, in accordance with an embodiment. Herein, CPE-A1 204 may be similar or equivalent to CPE-A1 104 and CPE-A2 206 may be similar or equivalent to CPE-A2 106 in its functionality and configurations.

Step S1 of the illustrated method in FIG. 2, may include a "set-up phase", in which, all nodes in the enterprise network and the core network may be configured to implement the addressing scheme presented in this disclosure. In one example, the source node may be configured to include the source address field and the destination address field in the inner header, according to the disclosed addressing scheme. The destination node may be configured to process the inner header that includes the source address field and the destination address field. Additionally, CPE-A1 204 may be configured to compress the inner header and CPE-A2 206 may be configured to decompress the inner header, in the manner described later in this disclosure.

Further, in the embodiments where the MPLS-based routing is implemented, the core nodes may be configured to process the compressed inner header and forward the data packet along a routing path of the data packet to subsequent nodes, according to the embodiments presented herein. However, if MPLS-based routing is not implemented (e.g. in SRv6 routing), each core node may be configured to decompress the compressed inner header to access the destination address and then, re-compress the data packet before transmitting to the next core node.

Additionally, in the set-up phase, all nodes in the enterprise network and the core network may be configured to establish connections with other nodes to implement the steps of the illustrated method, as described herein. In an embodiment, each core node in the core network 202 may be configured to establish hop-by-hop tunnels with its adjacent core nodes to form a mesh network. For example, CPE-A1 204 may be configured to establish a hop-by-hop tunnel with an ingress core node e.g., C1 308. Similarly, CPE-A2 206 may be configured to establish a hop-by-hop tunnel with an egress core node e.g., C3 312.

Further, CPE-A1 204 may establish a connection A1 with a controller 214 and transmit its control information over the connection A1 to the controller 214. The controller 214 may be similar in functioning to controller 114. Additionally, CPE-A2 206 may establish another connection A2 with the controller 214 and transmit its control information over the connection A2 to the controller 214. The controller 214 may then transmit the control information associated with CPE-A1 204 to CPE-A2 206 over the connection A2 and the control information associated with CPE-A2 206 to CPE-A1 204 over the connection A1. Once CPE-A1 204 receives the control information associated with CPE-A2 206, CPE-A1 204 may establish an end-to-end tunnel with CPE-A2 206.

In step S2, CPE-A1 204 may receive a data packet from a source node in the enterprise network 116. Here, the source node may be a node that creates the data packet. A person skilled in the art would understand that alternate variations are possible, wherein CPE-A1 204 may function as the source node and may thus, create the data packet instead of receiving it from another node. The data packet may include a payload portion, an inner header, and an outer header. In one example, the inner header may correspond to IPv6 header and the outer header may correspond to IPv4 header.

In step S3, CPE-A1 204 may compress the inner header of the data packet to obtain a compressed inner header. In one example, the inner header in the received data packet, may be a conventional IPv6 header that includes a 128-bit source address field and a 128-bit destination address field. In accordance with an embodiment, each of the device IDs and the slice ID may include 32-bit values. For example, the 128-bit source address field may include the 32-bit source device ID and the 32-bit slice ID to form the source address, according to the addressing scheme described earlier. Therefore, the combination of the source device ID and the slice ID utilizes 64 bits in the source address field. The remaining 64 bits in the source address field may remain unutilized. Similarly, the 128-bit destination field may include the 32-bit destination device ID and the 32-bit slice ID. Here, the slice ID included in the source address field is same as the slice ID in the destination address field. The combination of the 32-bit destination device ID with the 32-bit (re-used) slice ID forms the destination address and utilizes 64 bits in the destination address field. The remaining 64 bits in the destination address field may remain unutilized. In this example, the unutilized portion may, therefore, include a total of 128 bits in the inner header. In one example, the unutilized portion (i.e. 128 bits) may include "zero" bit values.

On receiving the data packet, CPE-A1 204 may determine that the source address and the destination address in the received data packet, utilize a total of 128 bits in the inner header. In other words, the remaining 128 bits from the conventional source and destination address fields combined, are unutilized, according to the embodiments of this disclosure. The unutilized bits may be referred to as the unutilized portion, in this embodiment. The size of the unutilized portion may accordingly vary. CPE-A1 204 may compress the inner header by discarding the unutilized portion and the (re-used) slice ID in the destination address field, to reduce the size of the inner header. In the above example, the compression may result in a reduction of 160 bits (128-bit unutilized portion+32-bit slice ID) from the inner header. This may consequently reduce the overall size of each corresponding data packet in a packet stream. In another embodiment, CPE-A1 204 may, however, compress the inner header by discarding the unutilized portion along with the slice ID from the source address field instead of the slice ID of the destination address field. The compressed inner header may then, include the 32-bit source device ID, the 32-bit destination device ID, and the 32-bit slice ID. These three fields in the inner header, therefore, occupy a total of 96 bits and may be subsequently, used to compute the source and destination addresses by CPE-A2 206 and the core nodes.

In another embodiment, CPE-A1 204 may compress the inner header by discarding the unutilized portion (128 bits). In this embodiment, the compressed inner header may include 128 bits because the re-used slice ID may not be discarded. Here, the compressed inner header may include the 32-bit source device ID, the 32-bit destination device ID, the 32-bit slice ID, and the 32-bit re-used slice ID. In this embodiment, CPE-A2 206 and the core nodes may use the 32-bit source device ID and the slice ID to compute the source address. Similarly, CPE-A2 206 and the core nodes may use the destination device ID and the slice ID to compute the destination address.

In yet another embodiment, the source device ID and the destination device ID may have a different size such as, but not limited to, to 24 bits each (instead of 32 bits each as described above). In this embodiment, the slice ID may include 40 bits. Accordingly, the compressed inner header may include the 24-bit source device ID, the 24-bit destination device ID, and the 40-bit slice ID. A person skilled in the art would acknowledge that the embodiments presented herein are not limited by the size of any of the device IDs and/or the slice ID and the size of each of the device IDs and the slice ID may vary according to implementation requirements.

In step S4, CPE-A1 204 may insert the version number in the version field of the compressed inner header. The version field may include the version number as a 4-bit value in the first nibble of the inner header. In one example, the version number of the IPv6 inner header before compression may be '6' (or '0110' as a 4-bit value). However, once the data packet (inner header) is compressed, CPE-A1 204 may update the version number to '7' and the version field may thus, correspond to '0111'. This may subsequently indicate to another node (e.g. core node) receiving the data packet, that the inner header is compressed in the above-described manner. Since the format of the compressed inner header is different from the conventional IPv6 header format, the format of the compressed inner header may be referred to as the IPv7 header format.

Here, when CPE-A2 206 subsequently receives the data packet, it may convert the IPv7 header format to the IPv6 header format by decompressing the inner header, for further transmission to destination node.

In an embodiment the enterprise networks 116 and 118, and the core network 202 may implement MPLS protocols for routing of the data packet. Accordingly, once the version field is inserted in the inner header, CPE-A1 204 may include the MPLS global label associated with the egress core node (i.e., C3 212) and the MPLS link label associated with the link between C3 212 and CPE-A2 206, in the outer header of the data packet. In this embodiment, CPE-A1 204 may have previously received the MPLS labels from the controller 214 via the connection A1 during the control plane communication session. Further, the controller 214 may have previously received these labels, over the connection A2, from CPE-A2 206. The MPLS labels described above may facilitate an MPLS-based routing of the data packet within the core network.

Further, in the embodiments where MPLS-based routing is implemented, CPE-A1 204 may transmit the data packet to the ingress core node (C1 208) of the core network 202, as illustrated in step S6. In steps S7-S12, the ingress core node (C1 208) may transmit the data packet to the egress core node (e.g. C3 212) via one or more intermediate core nodes (e.g. C2 210) of the core network 202, based on any conventional routing algorithm. In step S13, C3 212 may further transmit the data packet to CPE-A2 206, by performing an IPv6 lookup, which may decompress the data packet in the manner described later in this disclosure. In step S14, C3 212 may then, transmit the decompressed data packet to the destination node.

In other embodiments where SRv6 or another non-MPLS routing is implemented, CPE-A2 206 may not add MPLS labels to the data packet. In these embodiments, the data packet within the core network may be routed based on the destination address in the inner header of the data packet. In this embodiment, CPE-A1 204 may transmit the data packet to C1 208, as illustrated in step S6. However, C1 208 may decrypt/decapsulate the data packet and decompress the inner header to access the destination address in the inner header to determine a routing path. Once the routing path is determined, C1 208 may re-compress the inner header and re-encrypt/re-encapsulate the data packet for further transmission on the routing path. In steps S7-S12, C1 208 may transmit the data packet to C3 212 via one or more intermediate core nodes (e.g. C2 210), based on any conventional routing algorithm. Each core node may similarly decompress and re-compress the inner header before transmitting the data packet to another intermediate core node. In step S13, C3 212 may further transmit the data packet to CPE-A2 206, which may decompress the data packet in the manner described later in this disclosure. In step S14, C3 212 may then, transmit the data packet to the destination node.

In an alternate embodiment, however, the method described in the context of FIG. 2 may optionally proceed to step S5. In this embodiment, in step S5, CPE-A1 204 may encrypt and/or encapsulate the data packet, according to any of the encryption and encapsulation techniques described earlier. The encryption and encapsulation may be performed to increase the security of the data packet so that any $3^{rd}$-party attacker is unable to access any sensitive customer data in the payload portion of the data packet.

In step S6, CPE-A1 204 may transmit the encapsulated (and/or encrypted) data packet to the ingress core node of the core network 202. CPE-A1 204 may transmit the encapsulated data packet via both tunnels (end-to-end and hop-to-hop tunnels) to the core network 202, in step S6. In one example of such embodiments, the encapsulated data packet may be transmitted such that the compressed inner header (e.g. IPv7 header) may be transmitted through the end-to-end tunnel and the outer header (e.g. IPv4) may be transmitted through the hop-to-hop tunnel between CPE-A1 204 and C1 208. Further, once CPE-A1 204 transmits the encapsulated data packet, C1 208 may receive the data packet and act as the ingress core node to the data packet into the core network 202. In these embodiments, each core node may be configured to decapsulate the data packet to access its metadata portion (e.g one or more headers) and then, re-encapsulate the data packet for transmission to its next destined node.

In step S7, C1 208 may receive the data packet. On receiving the data packet, C1 208 may determine, based on the version number, that the compression of the inner header was performed, in the above-described manner. Accordingly, C1 208 may determine a routing path for the received data packet based on the MPLS label associated with C3 212, in the outer header of the data packet, in the manner described earlier in this disclosure.

In the alternate embodiment where CPE-A1 204 did not include the MPLS labels in the data packet, C1 208 may decompress the inner header of the data packet to access the destination address. In an embodiment, C1 208 may additionally decrypt/decapsulate the data packet based on a hop-by-hop security association between CPE-A1 204 and C1 208. C1 208 may, then, determine the routing path of the data packet based on the destination address, using known SRv6 routing mechanisms. Once the routing path is determined, C1 208 may transmit the data packet on its next destined core node (e.g. C2 210) on the determined routing path.

A similar procedure as explained above may be implemented at each core node to determine the routing path of the data packet, until the data packet reaches C3 212. Here, if MPLS-based routing is implemented in the core network 202, each core node may access the MPLS labels from the outer header without decompressing the inner header. However, if a non-MPLS routing is implemented (e.g. SRv6), each core node may decompress the inner header to access the destination address and accordingly, determine the routing path of the data packet. Each such core node may then re-compress the inner header to transmit the re-compressed inner header to a next destined core node.

A person skilled in the art would understand that the illustrated number of core nodes are merely for exemplary purposes and the core network 202 may include any number of core nodes. In one example, the core network 202 may include several core nodes. All the core nodes may be inter-connected to form a mesh network, such that several routing paths from the ingress core node to the egress core node may be feasible to traverse the data packet through the core network 202. Here, when C1 208 accesses the outer/inner header, it may automatically select a specific routing path from all such feasible routing paths based on various parameters such as, but not limited to, network conditions, detection of broken hops in the core network, expected latency on a routing path, an expected time to live (TTL) for the data packet, a number of hops on a routing path, a detection of a compromised node and/or any known parameters for selecting routing paths. In an exemplary scenario, a preferred routing path such as the path through C1 208, C2 210, and C3 212 may be the one which provides a minimum expected latency, has no broken hops and no compromised nodes along the routing path. Additional or fewer of the above-mentioned parameters may be taken into consideration while selecting a path depending on the design requirements. In the illustrated example, C1 208 may, thus, determine that the next destined node for the data packet is C2 210 based on the above-described procedure.

In step S8, C1 208 may transmit the (encapsulated and/or encrypted) data packet to C2 210.

The above-described steps performed by C1 208 may be repeated by each intermediate core node along the routing path of the data packet. For instance, C2 210 may perform steps S9 and S10, which may correspond to steps S7 and S8, respectively, as performed by C1 208. In step S10, C2 210 may transmit the data packet to the egress core node C3 212 along the routing path of the data packet. In the alternate embodiment where non-MPLS routing is implemented, C2 210 may additionally decrypt the inner header to access the destination address in the inner header, as discussed earlier.

In step S11, C3 212 may receive the data packet. In step S12, C3 212 may transmit the data packet to CPE-A2 206. In one example where MPLS-based routing is implemented, the transmission of the data packet from C2 210 to C3 212 may be performed in accordance with an MPLS protocol, as described above. However, when C3 212 receives the data packet, it may decompress the data packet and perform an IPv6 lookup to determine an address of the CPE A2 206, in one example. C3 212 may then, compress the inner header of the data packet and transmit the data packet including the compressed inner header to CPE A2 206. An advantage of this implementation is that C3 212 need not be modified to support the IPv7 header format and may implement any conventional IPv6 lookup and forwarding mechanism for routing of the data packet that includes the IPv7 header.

In step S13, CPE-A2 206 may receive the data packet. Further, CPE-A2 206 may also decompress the inner header by reconstructing the inner header to its uncompressed version (also referred to as full header). Here, CPE-A2 206 may access the version field of the inner header and understand that the compressed inner header is the IPv7 header that was compressed by CPE-A1 204, in the manner described above. CPE-A2 206 may, therefore, convert the IPv7 header format to the IPv6 header format, by decompressing the IPv7 header. The decompression may be performed to enable the destination node to process the data packet, later. In the embodiments where the data packet was encapsulated, CPE-A2 206 may decapsulate the data packet to access the inner and/or outer headers of the data packet based on a key shared by CPE-A1 204 with CPE-A2 206.

Based on the destination address in the inner header, CPE-A2 206 may transmit the data packet including the full inner header, to the destination node. The destination node may then, receive the data packet and decrypt the payload portion by using keys that have been previously shared by CPE-A1 204 with CPE-A2 206, via the controller 214, as a part of the control information. CPE-A2 206 may then share these keys with the destination node to decrypt the payload portion of the data packet.

Figure 3:
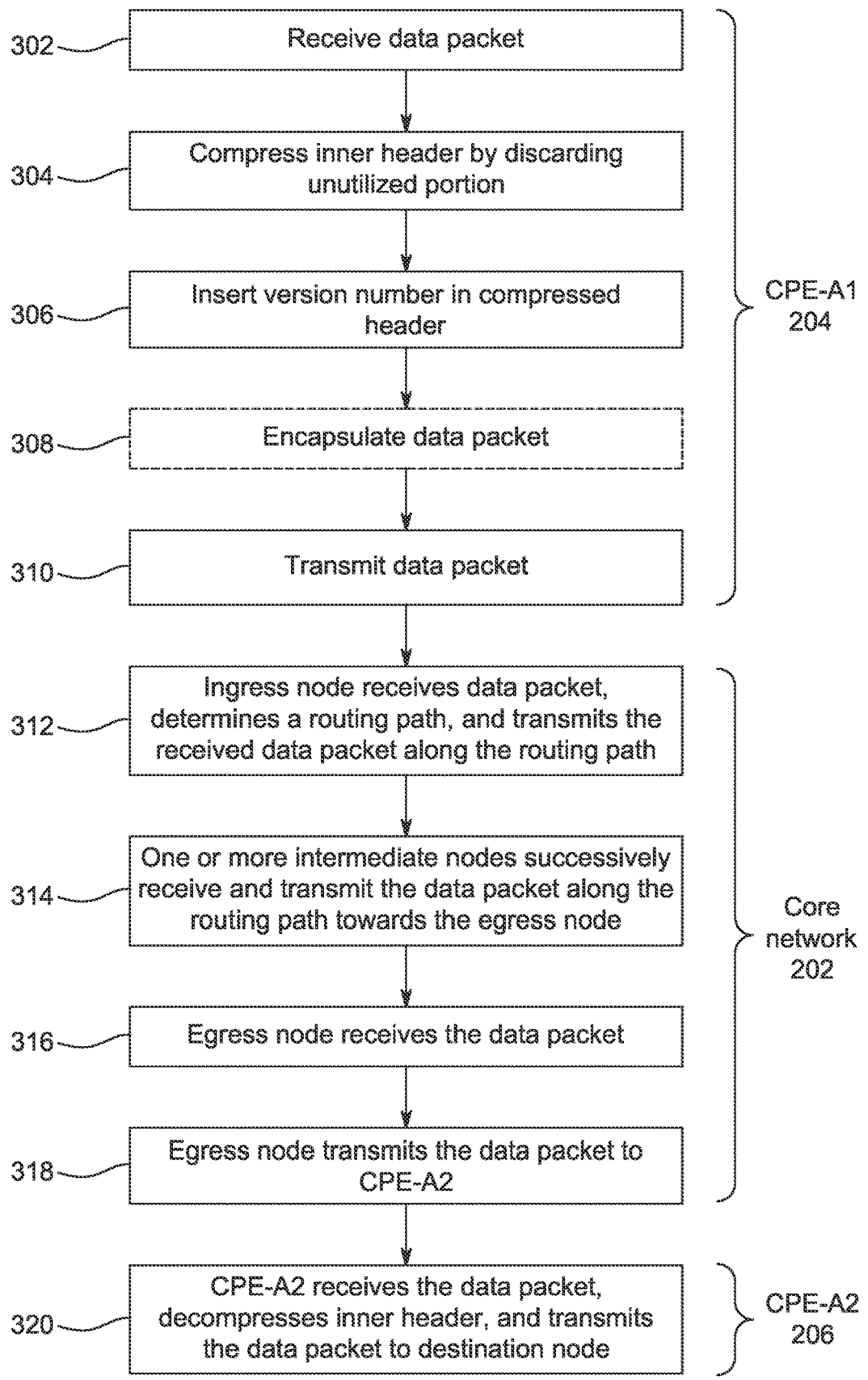
FIG. 3 is a flowchart illustrating the steps involved in communication of a data packet between enterprise nodes of enterprise networks, according to an embodiment.

FIG. 3 is a flowchart illustrating the steps involved in communication of a data packet between CPE-A1 204 and CPE-A2 206, according to an embodiment. In one example, these steps may be implemented in a communication network, such as the network architecture 100 illustrated in FIG. 1. As illustrated in FIG. 3, steps 302 to 310 may be performed by CPE-A1 204. Further, steps 312 to 318 may be performed in a core network corresponding to the core network 202. The core network may include an ingress core node that may correspond to C1 108 or C1 208 and an egress core node that may correspond to C3 112 or C3 212. The core network may additionally include one or more intermediate core nodes such as C2 110 or C2 210. A person skilled in the art would understand that any number of hops (or nodes) in the core network is feasible and the above-mentioned nodes are only for exemplary purposes. Further, step 320 may be performed by CPE-A2 206. Each step in FIG. 3 may be executed in a manner equivalent to as discussed in FIG. 2 and therefore, each step may not be described extensively again in the context of FIG. 3 for brevity.

Referring to FIG. 3, in step 302, CPE-A1 204 may receive a data packet from the source node. In step 304, CPE-A1 204 may compress the inner header in the data packet by discarding the unutilized portion. Further, CPE-A1 204 may then, insert the version number in the compressed inner header, in step 306. In step 308, CPE-A1 204 may optionally, encrypt and/or encapsulate the data packet. In step 310, CPE-A1 204 may transmit the data packet to the ingress core node of the core network.

In step 312, the ingress core node may receive the data packet, determine a routing path for the data packet, and transmit the received data packet along the routing path to its next destined core node. In step 314, one or more intermediate core nodes may successively receive and transmit the data packet along the routing path towards the egress core node. Here, if MPLS-based routing is implemented, the routing path may be determined based on MPLS labels in the data packet. However, if a non-MPLS based routing is implemented, the routing path may be determined based on the destination address in the inner header. Each core node may access this destination address by decompressing the inner header, as described earlier. Each core node may then, re-compress the inner header prior to further transmission of the data packet.

In step 316, the egress core node may receive the data packet. In step 318, the egress core node may transmit the data packet to CPE-A2 206. In step 320, CPE-A2 206 may receive the data packet, decompress the inner header, and transmit the data packet to the destination node. In embodiments where the data packet is encapsulated, CPE-A2 206 may decapsulate (and/or decrypt) the data packet to access the inner and/or outer headers of the data packet.

In accordance with the embodiments of this disclosure, the source and destination nodes, the ingress and egress CPEs, and the core node may include at least one processor and a memory storage that may store one or more computer-executable instructions. The computer-executable instructions, when executed, may cause the processor to perform the steps as described in the context of FIGS. 2 and 3. A person skilled in the art would understand that the disclosure is in no manner restricted by the number and/or type of the processor and/or memory storage included in the core nodes. Additionally, equivalent processors and/or memory storages may also be included in any of the other entities described in the context of FIGS. 1-3 to perform any step described in the context of FIGS. 2 and 3.

Figure 4A:
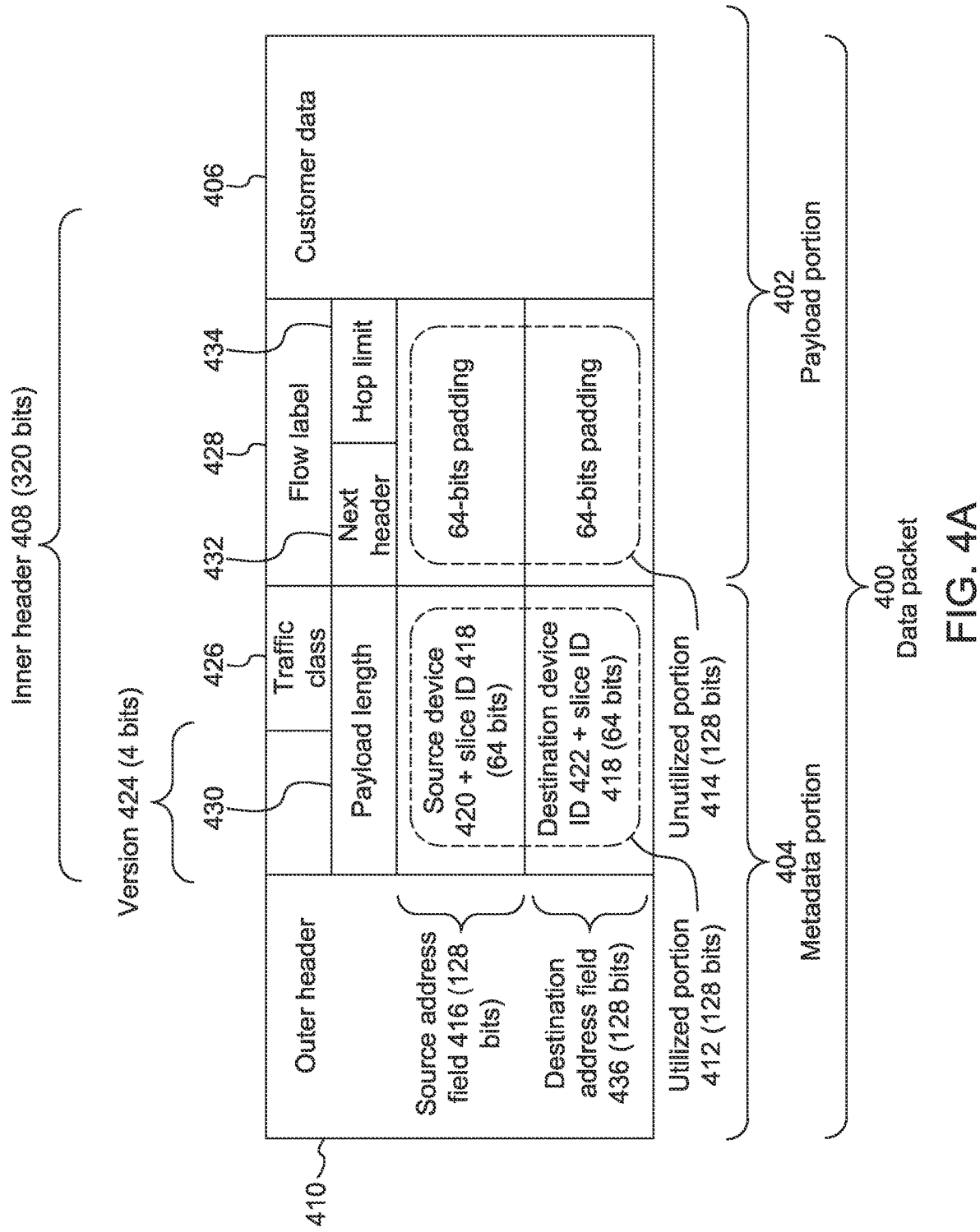
FIG. 4a illustrates an example format of a data packet received by an enterprise node of an enterprise network, according to an embodiment.

FIG. 4*a* illustrates an example format of a data packet 400 received by an ingress CPE such as CPE-A1 204, in accordance with the embodiments of this disclosure. The data packet 400 may include a payload portion 402 and a metadata portion 404. The payload portion 402 may include customer data 406 that may be sensitive and/or confidential. The metadata portion 404 may include one or more headers such an inner header 408 and an outer header 410.

Here, the inner header 408 may be an IPv6 header that may include 320 bits according to the known IPv6 header format. The inner header 408 may include a 128-bit source address field 416 and a 128-bit destination address field 436, as described earlier in this disclosure. In the source address field, 64 bits may be utilized by the 32-bit source device ID 420 and the 32-bit slice ID 418. The remaining 64 bits in the source address field, may be unutilized and/or include zero-bit values (or padding). In the destination address field, 64 bits may be utilized by the 32-bit destination device ID 420 and the 32-bit slice ID 418. The remaining 64 bits of the destination address field may be unutilized and/or include padding. Therefore, the unutilized portion 414 may include 128 bits, which includes 64 unutilized bits from each of the source address filed 416 and the destination address field 436. Further, the utilized portion 412 may include 128 bits that includes source device ID 420, the destination device ID, along with the slice ID 418 that is included twice (in both the source address field 416 and the destination address field 436). The opportunity for compression is available due to the unutilized portion 414 and the re-used slice ID 418.

The inner header 408 may also include a 4-bit version field 424, as described earlier. Here, the version field 424 may indicate the version of the inner header as version 6 because the illustrated inner header is uncompressed. The inner header 408 may additionally include one or more conventional header fields such as traffic class 426, flow label 428, payload length 430, next header 432, and hop limit 434.

Because of the address scheme described in the embodiments of this disclosure, the unutilized portion 414 is not required for the purposes of including any address related values. Therefore, the unutilized portion 414 may be discarded to reduce the size of the inner header, which results in reduction in the overall size of the data packet. Additionally, since the slice ID 418 is re-used in the destination address field 436, the re-used slice ID 418 may also be discarded along with the unutilized portion 414, in accordance with the embodiments presented herein.

Figure 4B:
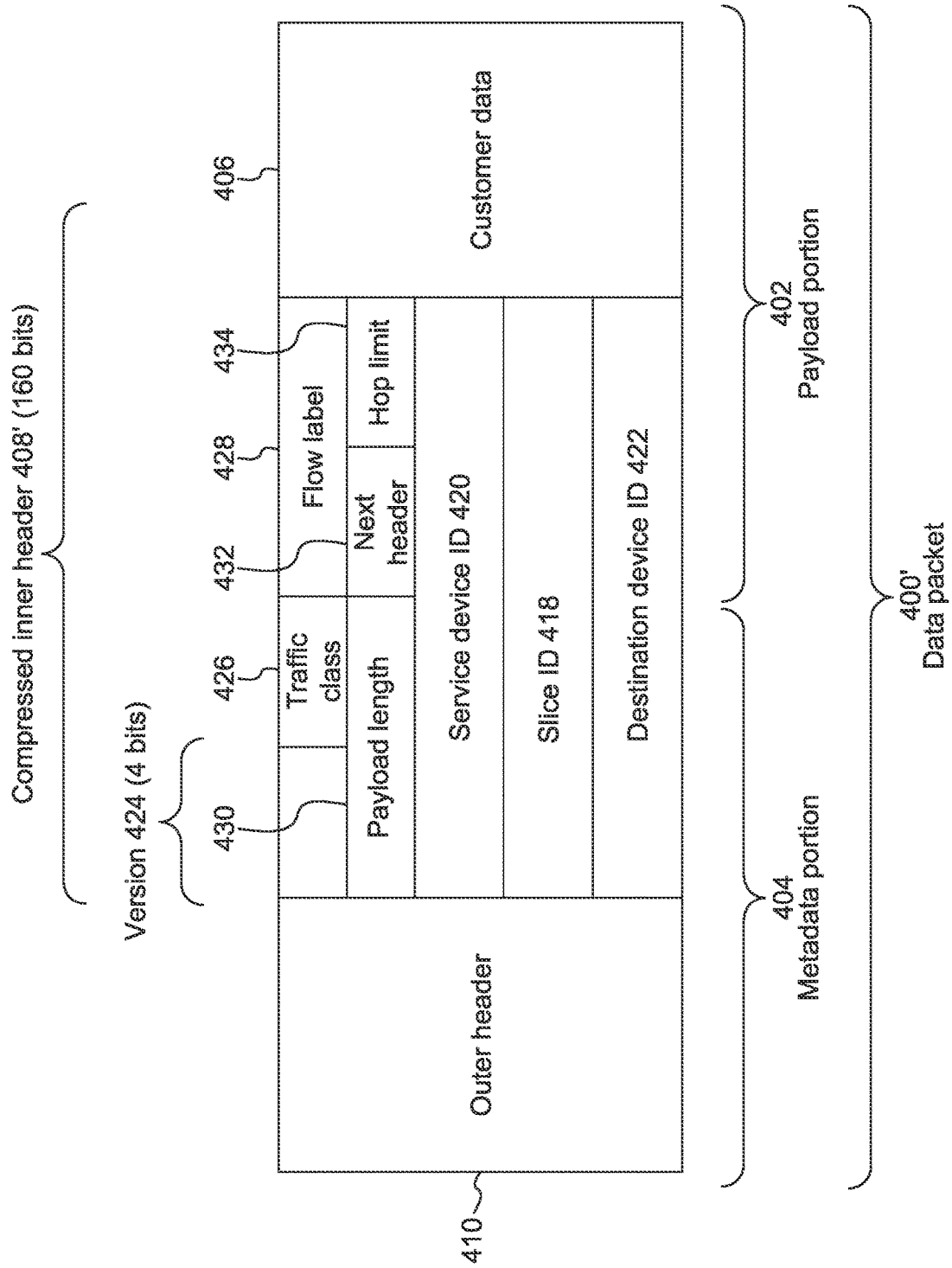
FIG. 4b illustrates an example format of a data packet that includes a compressed inner header, according to an embodiment.

FIG. 4*b* illustrates an example format of a data packet 400' that includes a compressed inner header 408', according to an embodiment. The compression may be performed by an ingress CPE such as CPE-A1 204 by discarding the unutilized portion 414, as described earlier in this disclosure. As described earlier, the compression may also be performed by each core node in the embodiments where non-MPLS based routing is implemented. In the illustrated figure, the compressed inner header may include the source device ID 420, the slice ID 418, and the destination device ID 422. These three fields are subsequently, used to compute the source address and the destination address. For instance, on decompressing the compressed header, the egress CPE and/or core nodes) may compute the source address based on the source device ID 420 and the slice ID 418. Similarly, the egress CPE and/or the core nodes may compute the destination address based on the destination device ID 422 and the slice ID 418. Additionally, the version indicated in the version field may be version 7 because this figure illustrates a compressed inner header 408', in accordance with the embodiments of this disclosure.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

The terms "comprising," "including," and "having," as used in the claim and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation. Additionally, it should be understood that the various embodiments of the networks, devices, and/or modules described herein contain optional features that can be individually or together applied to any other embodiment shown or contemplated here to be mixed and matched with the features of such networks, devices, and/or modules.

While the invention has been described with respect to a limited number of embodiments, those skilled in the art, having benefit of this disclosure, will appreciate that other embodiments can be devised which do not depart from the scope of the invention as disclosed herein.

We claim:

1. An ingress customer premises equipment (CPE) in a communication network, the ingress CPE comprising:
   a processor; and
   a memory storing computer-executable instructions that when executed, cause the processor to:
      compress an inner header of a data packet by discarding at least an unutilized portion in the inner header and retain at least a utilized portion in the inner header to obtain a compressed inner header,
      wherein the unutilized portion includes padding,
      wherein the utilized portion is usable to compute a source address associated with a source node of the data packet and a destination address associated with a destination node of the data packet, and
      wherein the inner header comprises a destination address field that corresponds to the destination node, and wherein the destination address field comprises a slice ID corresponding to a slice associated with the destination node.

2. The ingress CPE of claim 1, wherein the computer-executable instructions further cause the processor to receive the data packet from the source node, wherein the received data packet comprises the inner header, a payload portion, and an outer header, and further wherein, the inner header comprises the utilized portion and the unutilized portion.

3. The ingress CPE of claim 2, wherein the inner header comprises a source address field, wherein the source address field corresponds to the source node.

4. The ingress CPE of claim 1, wherein the computer-executable instructions further cause the processor to transmit the data packet to an ingress core node of a core network, wherein the ingress core node is configured to transmit the data packet to an egress core node via one or more intermediate core nodes of the core network.

5. The ingress CPE of claim 1, wherein the computer-executable instructions further cause the processor to transmit the data packet to an ingress core node of a core network, wherein the ingress core node is configured to:
   decompress the compressed inner header to access a destination address;
   re-compress the inner header; and
   transmit the data packet including the re-compressed inner header based on the destination address, to an egress core node via one or more intermediate core nodes of the core network.

6. The ingress CPE of claim 3, wherein the destination address field further comprises a device identifier (ID) corresponding to the destination node, and further wherein, the source address field comprises a device ID corresponding to the source node and the slice ID.

7. The ingress CPE of claim 6, wherein the computer-executable instructions further cause the processor to compress the inner header by discarding the slice ID from one of the source address field and the destination address field.

8. The ingress CPE of claim 6, wherein each of the device IDs comprise 32 bits, respectively, and the slice ID comprises 32 bits.

9. The ingress CPE of claim 1, wherein the unutilized portion comprises 128 bits.

10. The ingress CPE of claim 1, wherein the compressed inner header comprises a version field that indicates a version number associated with the compressed inner header.

11. The ingress CPE of claim 10, wherein the version number corresponds to Internet Protocol Version 7 (IPv7).

12. The ingress CPE of claim 6, wherein the compressed inner header comprises the source device ID, the destination device ID, and the slice ID.

13. The ingress CPE of claim 12, wherein each of the device IDs and the slice ID are usable to compute the source address associated with the source node and the destination address associated with the destination node.

14. The ingress CPE of claim 1, wherein the inner header is an Internet Protocol Version 6 (IPv6) header.

15. A header compression method implemented in an ingress customer premises equipment (CPE), the method comprising:
   compressing an inner header of a data packet by discarding at least an unutilized portion in the inner header and retaining at least a utilized portion in the inner header to obtain a compressed inner header, wherein the unutilized portion includes padding; and
   computing a source address associated with a source node of the data packet and a destination address associated with a destination node of the data packet by using the utilized portion,
   wherein the inner header comprises a destination address field that corresponds to the destination node, and wherein the destination address field comprises a slice ID corresponding to a slice associated with the destination node.

16. The method of claim 15, further comprising receiving the data packet from the source node, wherein the received data packet comprises the inner header, a payload portion, and an outer header, and further wherein, the inner header comprises the utilized portion and the unutilized portion.

17. The method of claim 16, wherein the inner header comprises a source address field, wherein the source address field corresponds to the source node.

18. The method of claim 17, wherein the destination address field further comprises a device identifier (ID) that identifies the destination node and, wherein the slice ID is associated with a group of devices associated with the destination node, and further wherein, the source address field comprises a device ID that identifies the source node and the slice ID.

19. The method of claim 18, further comprising compressing the inner header by discarding the slice ID from one of the source address field and the destination address field.

20. A core node in a core network, the core node comprising:
  a processor; and
  a memory storing computer-executable instructions that when executed, cause the processor to:
    decompress an inner header of a data packet to compute at least a destination address;
    determine a routing path from a plurality of routing paths based on at least the destination address and expected latency on each of the plurality of routing paths;
    re-compress the inner header; and
    transmit the data packet including the re-compressed inner header based on the determined routing path.

* * * * *